Jan. 18, 1966   A. GRASHOFF ETAL   3,229,799
ADJUSTABLE UNIVERSAL BAR ASSEMBLY
Filed April 11, 1963

INVENTORS
ALFRED GRASHOFF
KURT WERNER
BY
MICHAEL S. STRIKER
ATTORNEY

United States Patent Office 3,229,799
Patented Jan. 18, 1966

3,229,799
ADJUSTABLE UNIVERSAL BAR ASSEMBLY
Alfred Grashoff and Kurt Werner, Frankfurt am Main, Germany, assignors to Max Grundig, Furth, Bavaria, Germany
Filed Apr. 11, 1963, Ser. No. 272,429
Claims priority, application Germany, Apr. 14, 1962, G 34,738
17 Claims. (Cl. 197—97)

The present invention relates to a universal bar assembly for typewriters, and more particularly to an arrangement for adjusting the universal bar of a typewriter.

It is one subject of the invention to provide a universal bar assembly which can be easily adjusted to a position cooperating with all type levers in such a manner that irrespective of the position of the type lever on the type lever segment, the universal bar is actuated at the same moment.

Another object of the invention is to provide an adjustable universal bar assembly permitting an adjustment of a universal bar to a position in which the escapement mechanism is actuated by the universal bar at the moment of the stroke of any type lever bar.

Another object of the invention is to provide an easily adjusted universal bar assembly comprising few and inexpensive parts which require no machining, but nevertheless can be precisely adjusted.

With these objects in view, the present invention relates to a universal bar assembly for typewriters. One embodiment of the invention comprises supporting means including a guide member, such as a shaft, universal bar means including a guide means, preferably including a ball cage guided on the guide shaft for movement thereon, and adjustable mounting means for mounting the universal bar means on the supporting means for reciprocating movement in the axial direction of the guide shaft.

The universal bar means preferably include an arcuate universal bar, a U-shaped holding means secured to the universal bar, a guide ring secured to the holding means, and a ball cage having balls in contact with the guide ring and the guide shaft.

The adjustable mounting means preferably include a pair of lever means mounted for rocking movement, links pivotally connected with the lever means and having bores, and screws for adjustably connecting the links with the legs of the U-shaped holding means, and passing with adjusting play through the bores.

Since the ball cage has axial and radial play in the guide rign, an accurate adjustment of the universal bar is possible, so that the position of the main plane of the universal bar relative to the type bars can be precisely adjusted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
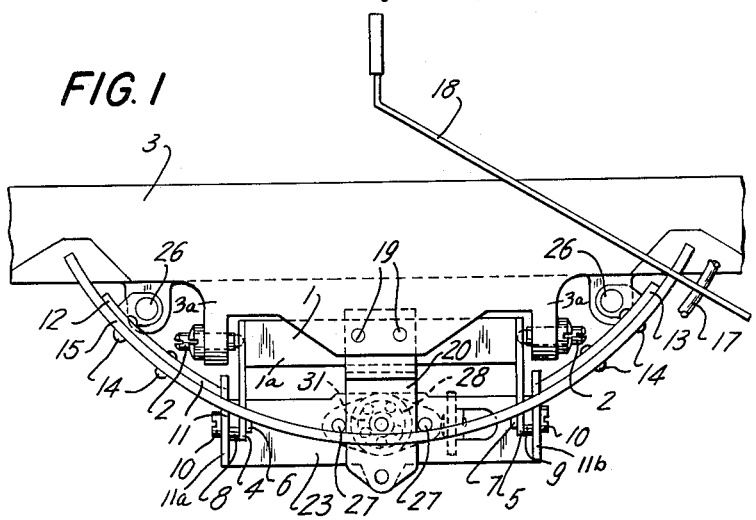
FIG. 1 is a front view of a universal bar assembly according to one embodiment of the invention, with a type bar shown in actuated position.

Referring now to the drawings, a rocking means 1 including a pair of levers 4 and 5, links 8, 9, and a transverse bar 1a connecting the levers, is mounted for turning movement about a pair of adjustable pivots 2 which are threaded into projecting brackets 3a of the supporting segment 3. The levers 4 and 5 are connected by pivots 6 and 7 to links 8 and 9 which are adjustably secured to a U-shaped holding means 23 and more particularly to the legs 11a and 11b of the same which extend parallel to the links 8 and 9. The legs 11a, 11b of holding means 23 have bores 10a, 10b, through which screws 10 pass and are connected by a yoke 11c. Screws 10 are threaded into corresponding threaded bores of links 8 and 9 and are smaller than bores 10a, 10b so that an adjustment of the relative position between rocking member 1 with links 8, 9 and holding means 23 is possible.

The holding means 23 is a part of the universal bar means 11 which is supported by adjustable mounting means 10a, 10b, 10 on rocking means 1, 4, 5, 6, 7, 8. Part-circular holding parts 12 and 13 extend from the legs of holding means 23 and an arcuate universal bar 15 is secured by rivets 14 to parts 12 and 13. Consequently, adjustment of the holding means 23 on the links 8 and 9 will influence the position of the main plane of the universal bar 15.

Such adjustment will vary and adjust the relative position between the edge 15a of the universal bar 15, and corresponding projections 16 of the type bars 18 which are mounted on a curved shaft 17 on the type lever segment 3.

When the universal bar 15 is accurately adjusted, all projections 16 cooperate with the circle of symmetry of the circular edge 15a.

Whenever a type lever action is actuated, the type bar 18 moves and projection 16 engages the universal bar 15, displacing the same with holding means 23 while the lever means 4 and 5 swing about the pivot means 2.

Since screws 10 have play in the bores 10a and 10b of holding means 23, the universal bar 15, and more particularly its edge 15a, can be adjusted in the direction of the arrow 25 so that irrespective of whether an outer or inner type bar is actuated, the escapement mechanism is actuated at the same moment through a connecting means 23a which is secured to holding means 23 of the universal bar means 11.

Figure 2:
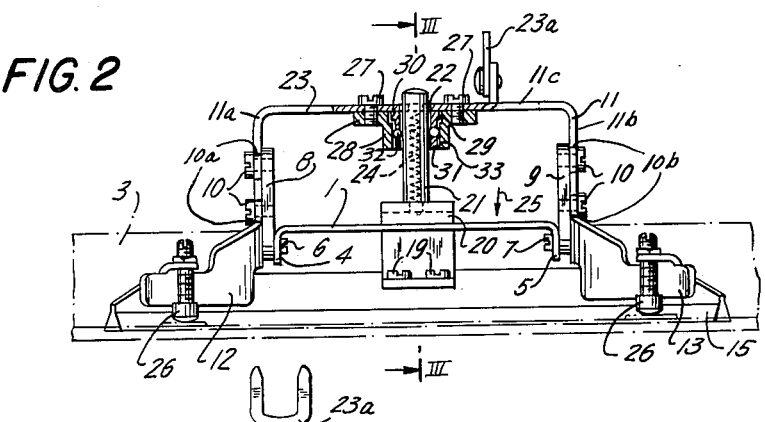
FIG. 2 is a plan view of the embodiment of FIG. 1 in a position of rest.

The supporting segment 3 supports a carrier 20 which is secured thereto by screws 19. The downwardly extending free end of carrier 20 supports a guide member or guide shaft 21 which passes through a corresponding bore 22 in the yoke 23 of the U-shaped holding means 23. A guide ring or guide means 28 is a part of the universal bar means 11 and is adjustably mounted on the yoke of holding means 23. This is accomplished by screws 27 passing through wider bores in the yoke of holding means 23 and into threaded bores of lateral parts of guide ring 28. The lower end of carrier 20 is connected by spring 24 to a downwardly projecting central part of the yoke 11c of holding means 23, so that the entire universal bar means 11 is urged in the direction of the arrow 25 until adjustable stop screws 26 on parts 12 and 13 abut corresponding abutments on the supporting segment 3, as best seen in FIGS. 1 and 2, stop screws 26 constituting means for limiting the reciprocating stroke of the universal bar means.

Figure 3:
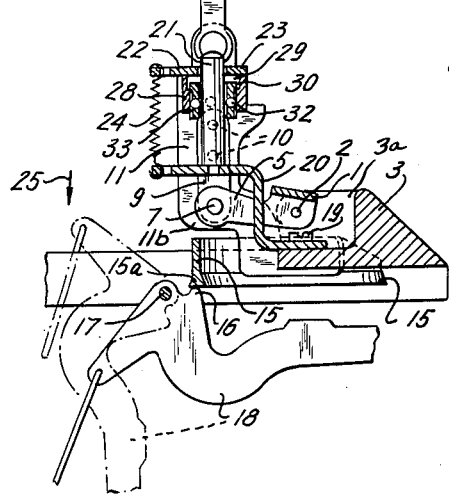
FIG. 3 is a cross sectional view taken on line III—III in FIG. 2.

The guide ring 28 has a circular inner recess 29 which a single row of surrounds a flange 30 on a ball cage 31 in which balls 32 is mounted. Balls 32 are in rolling engagement with the inner surface 33 of guide ring 28 and with the outer surface of the guide shaft 21 which is secured by carrier 20 to the supporting segment 3, as best seen in FIG. 3. Parts 12, 13, 26, 15, 23, 27, 28, 32, 33 form the universal bar means 11 and move together when a type lever 18 is operated.

The outer diameter of flange 30 of cage 31 is smaller than the inner diameter of the circular recess 29 in the guide ring 28, and the axial length or thickness of flange 30 of cage 31 is less than the axial length of the circular recess 29 so that a relative movement is possible. The ratio between the axial length of flange 30 and of recess 29 is such that flange 30 of ball cage 31 can move in axial direction only substantially half the stroke of the universal bar means 11. During such relative movement, the balls 32 roll on the inner surface of recess 33, and also on the guide shaft 21. Due to the adjustability of guide ring 28 on holding means 23, the universal bar means 11 including holding means 23 and universal bar 15 can be turned about pivot means 6 and 7 until the center part of edge 15a and the ends of edge 15a are located in a main plane corresponding to the plane in which the projections of all type bars 18 are located so that, irrespective of which type bar is actuated, the universal bar is displaced at the same moment of the movement of the type bar.

The desired precise relative adjustment between the type bars and the universal bar 15, can be easily obtained by adjusting the position of the guide ring 28, and by adjusting the links 8 and 9.

When the desired adjusted position has been found, the screws 10 and 27, respectively are tightened.

Since the holding means 23 is mounted for turning movement on guide shaft 21, it is also possible to turn the universal bar 15 about shaft 21 until the ends of universal bar 15 are located at the same height. The play of screws 10 in the corresponding bores 10a, 10b in the legs of holding means 23 permit such an adjustment. When the position of links 8 and 9 relative to the legs of holding means 23 is adjusted in the direction of shaft 21, the yoke 23 moves on shaft 21 until the main plane of edge 15a is properly located. Holding means 23 with guide ring 28 can also be slightly tilted about the single row of balls 32 so that the universal bar means 11 can be tilted about axes perpendicular to the axis of shaft 21 resulting in a corresponding tilting of surface 15a.

It will be understood that each of the elements described above, or two or more together, may also find a useful application in other types of universal bar assemblies differening from the types described above.

While the invention has been illustrated and described as embodied in a universal bar assembly adjustably mounted in a typewriter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Universal bar assembly for typewriters, comprising in combination, supporting means including a guide shaft having a first axis; universal bar means including a guide means guided on said guide shaft for axial and turning movement thereon; rocking means mounted on said supporting means for rocking movement about a second axis; and adjustable mounting means for mounting said universal bar means on said rocking means for reciprocating movement in the axial direction of said guide shaft with said rocking means, and adjustable in the direction of said first axis, about said first axis, and about an axis perpendicular to said first and second axes.

2. Universal bar assembly for typewriters, comprising, in combination, supporting means including a guide member extending in one direction; rocking means mounted on said supporting means for rocking movement about an axis perpendicular to said direction; universal bar means including an adjustable guide means guided on said guide member for movement thereon in said direction and for turning movement about another axis extending in said direction; and adjustable mounting means for mounting said universal bar means on said rocking means for reciprocating movement with said rocking means, and adjustable about said other axis, in said one direction and about a third axis perpendicular to both said axes.

3. Universal bar assembly for typewriters, comprising, in combination, supporting means including a guide member extending in one direction; rocking means mounted on said supporting means for rocking movement about an axis perpendicular to said direction; universal bar means including an arcurate universal bar, a holding means secured to said universal bar, a guide ring adjustably secured to said holding means, and a ball cage having balls located between and in contact with said guide ring and said guide member so that said universal bar means is guided on said guide member for movement thereon in said direction and for turning movement about another axis extending in said direction; and adjustable mounting means for mounting said universal bar means on said rocking means for reciprocating movement with said rocking means, and adjustable about said other axis, in said one direction and about a third axis perpendicular to both said axes.

4. Universal bar assembly for typewriters, comprising, in combination, supporting means including a guide member extending in one direction; rocking means mounted on said supporting means for rocking movement about an axis perpendicular to said direction; universal bar means including an arcuate universal bar, a U-shaped holding means having legs secured to said universal bar and a yoke connecting said legs, a guide ring adjustably secured to said yoke of said holding means, and a ball cage having balls located between and in contact with said guide ring and said guide member so that said universal bar means is guided on said guide member for movement thereon in said direction and for turning movement about another axis extending in said direction; and adjustable mounting means for mounting said universal bar means on said rocking means for reciprocating movement with said rocking means, and adjustable about said other axis, in said one direction and about a third axis perpendicular to both said axes.

5. Universal bar assembly for typewriters, comprising, in combination, supporting means including a guide member; universal bar means including an arcuate universal bar, a U-shaped holding means having legs secured to said universal bar and a yoke connecting said legs, said legs having bores, a guide ring adjustably secured to said yoke of said holding means, and a ball cage having balls located between and in contact with said guide ring and said guide member so that said universal bar means is guided on said guide member for movement thereon; and adjustable mounting means for mounting said universal bar means on said supporting means for reciprocating movement and including lever means mounted on said supporting means for rocking movement, link means pivotally connected with said lever means, and screw means for adjustably connecting said link means with said legs and passing through said bores with adjusting play.

6. Universal bar assembly for typewriters, comprising, in combination, supporting means including a guide shaft extending in one direction; rocking means mounted on said supporting means for rocking movement about an axis perpendicular to said direction; universal bar means including an arcuate universal bar, a holding means secured to said universal bar, a guide ring adjustably secured to said holding means and being formed with an inner annular recess, and a ball cage having an outer flange located in said recess and balls located between and in contact with said guide ring and said guide shaft so that said universal bar means is guided on said guide shaft for movement thereon in said direction and for turning movement about another axis extending in said direction; and adjustable mounting means for mounting said universal bar means on said rocking means for reciprocating movement with said rocking means, and adjustable about said other axis, in said one direction and about a third axis perpendicular to both said axes.

7. Universal bar assembly for typewriters, comprising, in combination, supporting means including a guide shaft extending in one direction; rocking means mounted on said supporting means for rocking movement about an axis perpendicular to said direction; universal bar means including an arcuate universal bar, a holding means secured to said universal bar, a guide ring adjustably secured to said holding means and being formed with an inner annular recess, and a ball cage having an outer flange located in said recess having an outer diameter smaller than the inner diameter of said recess, and balls contained in said ball cage located between and in contact with said guide ring and said guide shaft so that said universal bar means is guided on said guide shaft for movement thereon in said direction and for turning movement about another axis extending in said direction; and adjustable mounting means for mounting said universal bar means on said rocking means for reciprocating movement with said rocking means, and adjustable about said other axis, in said one direction and about a third axis perpendicular to both said axes.

8. Universal bar assembly for typewriters, comprising, in combination, supporting means including a guide shaft; universal bar means including an arcuate universal bar, a holding means secured to said universal bar, a guide ring adjustably secured to said holding means and being formed with an inner annular recess having a first axial length, and a ball cage having an outer flange located in said recess having a second axial length smaller than said first axial length, and balls contained in said ball cage located between and in contact with said guide ring and said guide shaft so that said universal bar means is guided on said guide shaft for so that said universal bar means is guided on said guide shaft for movement thereon; and adjustable mounting means for mounting said universal bar means on said supporting means for reciprocating movement.

9. Universal bar assembly for typewriters, comprising, in combination, supporting means including a guide shaft; universal bar means including an arcuate universal bar, a holding means secured to said universal bar, a guide ring adjustable secured to said holding means and being formed with an inner annular recess having a first axial length, and a ball cage having an outer flange located in said recess, said flange having an outer diameter smaller than the inner diameter of said recess and a second axial length smaller than said first axial length, and balls contained in said ball cage located between and in contact with said guide ring and said guide shaft so that said universal bar means is guided on said guide shaft for movement thereon; and adjustable mounting means for mounting said universal bar means on said supporting means for reciprocating movement.

10. A universal bar assembly as set forth in claim 9 and including stop means for limiting the reciprocating stroke of said universal bar means; and wherein said first and second axial length are in such a ratio that the axial movement of said flange in said recess is limited to substantially half the reciprocating stroke of said universal bar means.

11. Universal bar assembly for typewriters, comprising, in combination, supporting means including a guide shaft; universal bar means including an arcuate universal bar, a U-shaped holding means having legs secured to said universal bar and a yoke connecting said legs, said legs having bores, a guide ring adjustably secured to said yoke of said holding means and being formed with in inner annular recess, and a ball cage having an outer flange located in said recess and balls contained in said ball cage located between and in contact with said guide ring and said guide shaft so that said universal bar means is guided on said guide shaft for movement thereon; and adjustable mounting means for mounting said universal bar means on said supporting means for reciprocating movement and including lever means mounted on said supporting means for rocking movement, link means pivotally connected with said lever means, and screw means for adjustably connecting said link means with said legs and passing through said bores with adjusting play.

12. A universal bar assembly as set forth in claim 11 wherein said flange has a smaller diameter than said recess, and a shorter axial length than said recess.

13. A universal bar assembly as set forth in claim 11 wherein said link means are parallel with said legs; and wherein said legs extend perpendicularly to the main plane of said arcuate universal bar.

14. Universal bar assembly for typewriters, comprising, in combination, supporting means including a type bar segment, a carrier secured to said segment and a guide shaft mounted on said carrier; universal bar means including an arcuate universal bar, a U-shaped holding means having legs secured to said universal bar and a yoke connecting said legs, said legs having bores, a guide ring adjustably secured to said yoke of said holding means and being formed with an inner annular recess, and a ball cage having an outer flange movably disposed in said recess and balls located between and in contact with said guide ring and said guide shaft so that said universal bar means is guided on said guide shaft for movement thereon; and adjustable mounting means for mounting said universal bar means for reciprocating movement and including lever means mounted on said segment for rocking movement, link means pivotally connected with said lever means, and screw means for adjustably connecting said link means with said legs and passing through said bores with adjusting play.

15. A universal bar assembly comprising, in combination, supporting means; rocking means mounted on said supporting means about a rocking axis; universal bar mean including a guide means having at least two relatively movable parts, a universal bar having a surface adapted to be engaged by type bars and located in a plane parallel to said rocking axis; mounting means for mounting said universal bar means on said rocking means for movement with the same in a direction perpendicular to said plane, and including adjusting means for adjusting the position of said universal bar in said plane and in said direction, and by tilting said universal bar relative to said plane; and a guide member secured to said supporting means extending in said direction for supporting said guide means of said universal bar means for translatory movement in said direction, for angular movements about axes perpendicular to said rocking axis and for turning movement about an axis extending in said direction whereby the position of said surface of said universal bar can be adjusted by said adjusting means.

16. Universal bar assembly for typewriters, comprising in combination, supporting means including a guide member extending in one direction; rocking means mounted on said supporting means for rocking movement about an axis perpendicular to said direction; universal bar means including an arcuate universal bar, a holding means secured to said universal bar, and a guide means adjustably secured to said holding means and guided on said guide member for movement thereon in said direction for turning movement about another axis extending in said direction; and adjustable mounting means for mounting said universal bar means on said rocking means for reciprocating movement with said rocking means, and adjustable about said other axis, in said one direction and about a third axis perpendicular to both said axes.

17. Universal bar assembly for typewriters, comprising, in combination, supporting means including a guide member; rocking means mounted on said supporting means about a rocking axis; universal bar means including an arcuate universal bar, a holding means secured to said universal bar, a guide means adjustably secured to said holding means and guided on said guide member for movement thereon along a predetermined axis and turnably relative thereto; and mounting means for mounting said universal bar means on said rocking means for reciprocating movement with the same in direction of said predetermined axis, said mounting means being adjustably movable relative to said universal bar means about said predetermined axis and about an axis perpendicular to said axes and fixable in the required adjusted turn position.

References Cited by the Examiner

UNITED STATES PATENTS

| | | | |
|---|---|---|---|
| 1,032,685 | 7/1912 | Knapp | 197—97 |
| 1,177,943 | 4/1916 | Fox | 197—97 |
| 1,185,299 | 5/1916 | Felbel | 197—97 X |
| 1,491,709 | 4/1924 | Latta | 197—97 |
| 1,516,922 | 11/1924 | Helmond | 197—97 |
| 1,640,841 | 8/1927 | Kurowskie | 197—97 X |
| 1,909,764 | 5/1933 | Helmond | 197—97 |
| 2,626,694 | 1/1953 | Helmond | 197—97 |
| 3,029,110 | 4/1962 | Hughes | 308—6 |

ROBERT E. PULFREY, *Primary Examiner.*